I. B. SMITH AND C. R. CARY.
ELECTRICAL MEASURING APPARATUS.
APPLICATION FILED MAR. 6, 1918.

1,314,610.

Patented Sept. 2, 1919.
2 SHEETS—SHEET 1.

Inventors
Irving B. Smith
and
Charles R. Cary
by Cornelius D. Ehret Attorney

I. B. SMITH AND C. R. CARY.
ELECTRICAL MEASURING APPARATUS.
APPLICATION FILED MAR. 6, 1918.
1,314,610.
Patented Sept. 2, 1919.
2 SHEETS—SHEET 2.
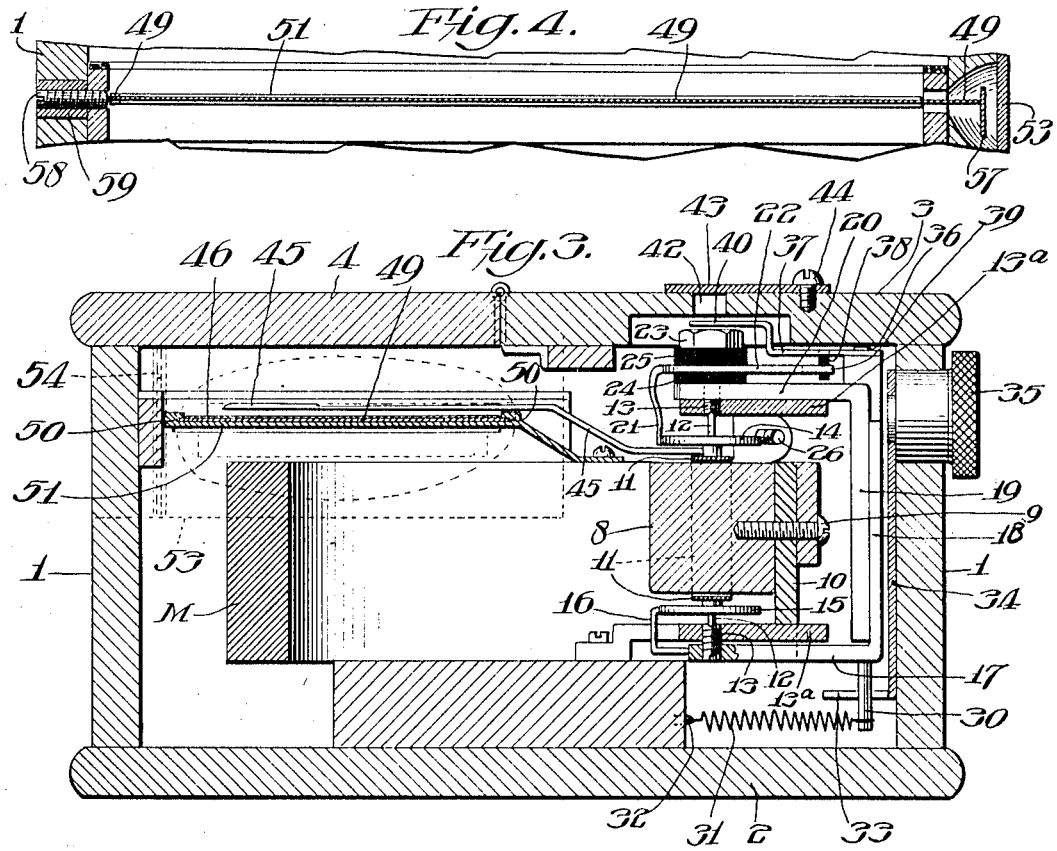
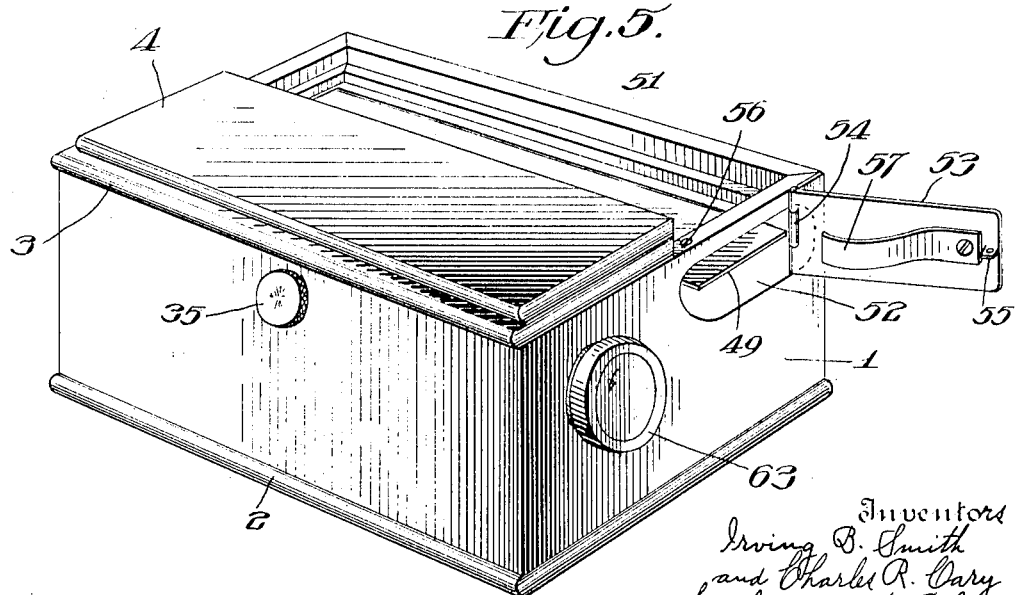
Inventors
Irving B. Smith
and Charles R. Cary
by Cornelius D. Ehret
Attorney

UNITED STATES PATENT OFFICE.

IRVING B. SMITH, OF AMBLER, AND CHARLES R. CARY, OF PHILADELPHIA, PENNSYLVANIA, ASSIGNORS TO LEEDS & NORTHRUP COMPANY, OF PHILADELPHIA, PENNSYLVANIA, A CORPORATION OF PENNSYLVANIA.

ELECTRICAL MEASURING APPARATUS.

1,314,610.  Specification of Letters Patent.  Patented Sept. 2, 1919.

Application filed March 6, 1918. Serial No. 220,679.

*To all whom it may concern:*

Be it known that we, IRVING B. SMITH and CHARLES R. CARY, citizens of the United States, residing, respectively, in Ambler, State of Pennyslvania, and Germantown, Philadelphia, State of Pennsylvania, have invented certain new and useful Improvements in Electrical Measuring Apparatus, of which the following is a specification.

Our invention relates to electrical measuring apparatus, such as a galvanometer having a member movable in a magnetic field, and more particularly to a galvanometer of the D'Arsonval type comprising a coil movable in the field of a permanent magnet, the coil carrying a pointer coöperating with a scale.

It is the object of our invention to provide means for determining whether the spring or equivalent control of the moving coil of apparatus of the character above referred to is properly set or in calibration, notwithstanding the true zero or position of coil and pointer for no current through the coil is suppressed, that is, at a position to which the coil cannot move, due to structural limitations of the apparatus, or at a position in which the pointer would not be visible.

To this and other ends hereinafter referred to we provide structure whereby when current is to be measured, the control for the movable member is so set by a movable frame or equivalent structure that the movable member is held thereby against a stop from which it does not deflect, to carry the pointer over the scale, until the current through the instrument has attained a predetermined value; and whereby, when it is to be determined whether the pointer with no current through the instrument properly points at zero, the control is so operated upon by moving the frame to another position as to reduce to zero the force exerted by the control upon the movable member with the pointer at or near the beginning of the scale, or in any event, in a position in which it may be compared with a zero marking or indication displaced by correct amount from the true or suppressed zero.

By such construction it is possible with an instrument having a suppressed zero quickly and with accuracy to determine, by merely shifting the frame from its one position to the other, whether the instrument is in calibration by noting whether or not the pointer lies at the displaced or visible zero. If the pointer registers accurately with such displaced zero, the control is in proper adjustment and the frame may be returned to its normal position and the instrument used with assurance that so far as regards its control, it is in calibration. If, on the other hand, the pointer does not register with the displaced zero, the setting or tension of the control is adjusted until it does so register, whereupon the frame may be moved to its other position and the instrument used in making measurements.

For an illustration of one of the various forms our invention may take, reference is to be had to the accompanying drawings, in which:

Fig. 3 is a vertical sectional view, some parts in elevation, on the line 3—3 of Fig. 1.

Fig. 4 is a fragmentary sectional view on the line 4—4 of Fig. 1.

Fig. 5 is a view in perspective of the instrument box or casing partly open.

Figure 1:
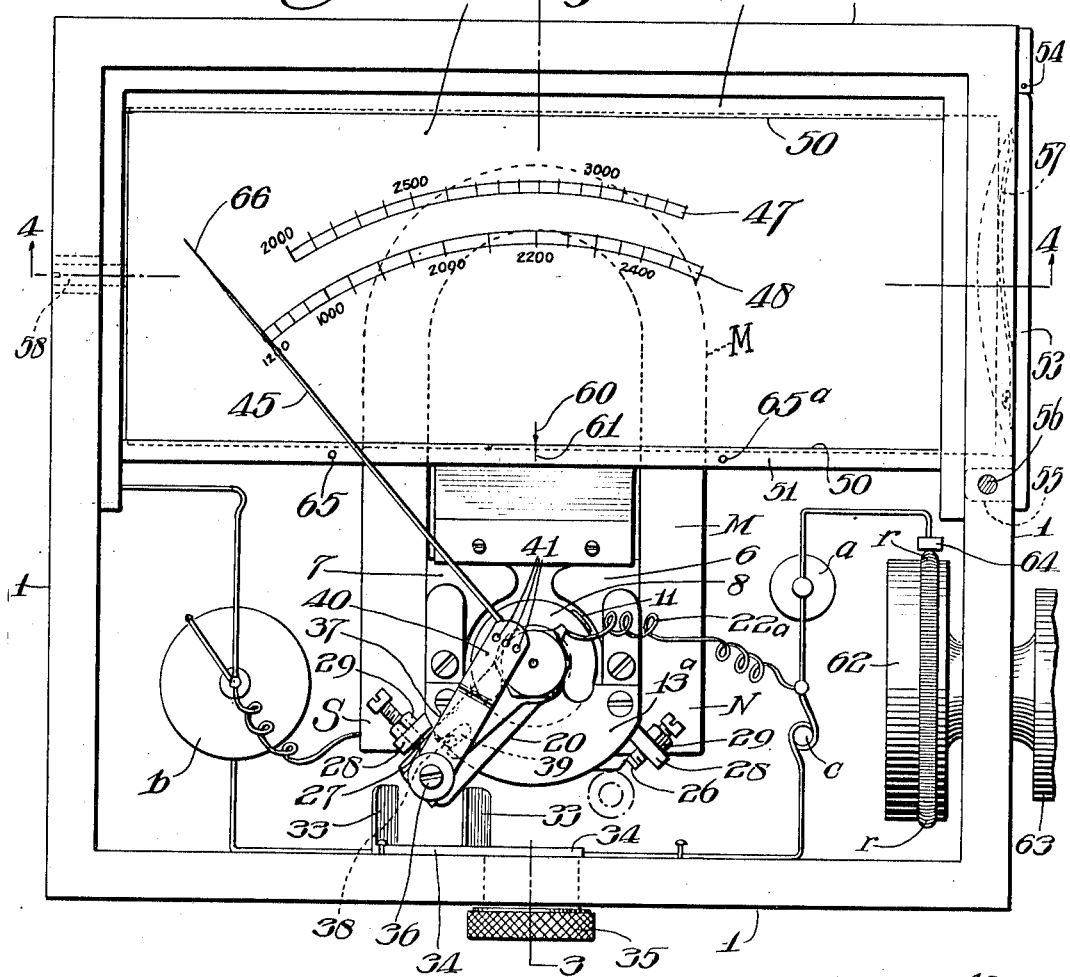
Figure 1 is a top plan view of apparatus embodying our invention.
Figure 2:
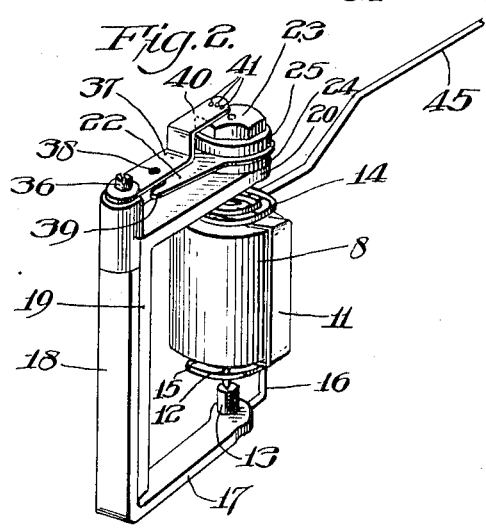
Fig. 2 is a perspective view of part of the apparatus of Fig. 1.

Referring to the drawings, 1 is a casing or box having the bottom 2 and the cover sections 3 and 4, the latter hinged upon the former at 5.

Within the box is disposed a D'Arsonval galvanometer comprising the permanent magnet M whose poles are indicated at N and S. Associated with the magnet poles are the pole pieces 6 and 7, of iron or other suitable magnetizable material, between which is disposed the cylindrical core 8, of iron, held by screw 9 to the support 10. The core 8 is spaced from the pole pieces 6 and 7 to form short air gaps within which is rotatable the rectangular moving coil 11 having the co-axial pivots 12, 12 bearing at their ends in the pivot supports 13 supported in the fixed members 13[a]. Associated with the upper and lower pivots 12, 12 are the upper and lower flat spiral springs 14 and 15. One end of each of these springs is secured to a pivot 12. The outer end of the spring 15 is connected to the member or abutment 16 secured to the frame member 17 having the vertically extending portion 18, to which is secured the vertical portion 19 of the frame member 20. Secured to and movable with the frame member 20 is the member or abutment 21, to which is secured the outer end of the control spring 14, the member 21 extending upwardly and then horizontally in the portion 22, pivoted on the member 20 and held by nut 23 between the insulating members 24 and 25. One terminal of the coil 11 connects to the lower pivot 12 and through the spring 15 to the member 16, which connects to the metallic framework of the instrument, which in effect constitutes one terminal of the coil 11. The other terminal of the coil 11 connects to the upper pivot 12 and through the spring 14 and member 21 to the member 22, which in effect constitutes the other terminal of the coil 11 and to which connection is made by a flexible conductor 22$^a$, Fig. 1. The pivots 12 are insulated from each other and generally bear in jewels, which are of insulating material, in the members 13. The frame members 17 and 20 constitute a frame or structure which is pivoted upon the members 13, 13 co-axial with the coil 11. And since the outer ends of the control springs 14 and 15 are attached to members which move with this frame or structure, the pivotal movement of the frame will change the tension or setting of the control springs for a given position of coil 11.

To permit assembly of the apparatus, the frame is made in the two parts as described.

The frame is movable about the axis of the coil 11 between the abutments 26, 27, which are adjustable and comprise screws threaded through the lugs 28 on the framework of the apparatus, the abutments being locked in adjusted position by the nuts 29.

Secured to the frame member 17 and extending downwardly therefrom is the pin 30, to which is attached one end of the spring 31 whose other end is attached to a fixed part of the apparatus at point 32 located practically mid-way between the poles of the magnet M, or to one side of such midpoint for certain purposes hereinafter referred to. The pin 30 is disposed between the lugs 33, spaced from each other and disposed at the lower end of the member 34 secured at its upper end to swing by the turn button 35. By turning the button 35 the frame can be moved from its position against one abutment, as 27, to its other position against the other abutment 26, the spring 31 holding the frame in either of these positions when its end 32 is practically mid-way between the poles of magnet M, the spring 31 being under greatest tension as the frame passes through position mid-way between the abutments. In other words, the spring 31 is so applied to the frame that it is held against either abutment, and may not of itself remain in any intermediate position.

Pivoted at 36 to the upper end of the frame member 18 is the horizontally extending arm 37 carrying a pin 38 which extends downwardly into a slot in the forked end 39 of the member 22. The arm 37 terminates in a portion 40 swingable above the nut 23, and having a plurality of holes or depressions 41 for the insertion of a pointed instrument through the hole 42 in the cover member 3, the hole 42 being uncovered for insertion of the instrument from the outside of the box by shifting to one side the small cover 43 held to the cover 3 by and pivoted upon the screw 44.

By this structure the arm 37 may be moved upon its pivot 36 and so transmit to the arm 22 a pivotal movement for shifting, with respect to the frame member 20, the abutment 21, thereby changing the effective setting or tension of the control springs 14 and 15.

Attached to the movable coil 11 is the needle or pointer 45 moved by the coil 11 across the scale card 46, having thereon the calibrated scales 47 and 48. The scale card 46 is secured upon the scale plate 49, which engages in the grooves 50 disposed parallel to each other along the edges of the plate 51.

The box 1 has an opening 52 which is closed by the flap or door 53 hinged at 54 and carrying a lug 55 having a vertical hole through which extends a vertical pin or screw 56 through the upper edge of the box 1.

On the inside of the door or flap 53 is secured the yielding member or leaf spring 57 against which the end of the scale plate 49 engages. A screw 58, threaded in the bushing 59 in the wall of the box 1, engages the other end of the plate 49. By turning the screw 58 the plate 49 is movable with great nicety to right or the left, as viewed in Fig. 1, to bring a check mark 60 on the scale card 46 into accurate register with a mark 61 on the member 51 or any other part of the instrument in definite or fixed position with respect to the pivotal axis of the coil 11.

Figure 6:
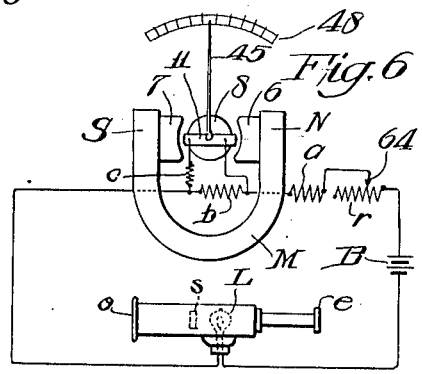
Fig. 6 is a diagrammatic view illustrating an example of use of our apparatus and an example of electrical connections.

For an illustration of one of various uses of our apparatus, reference may be had to Fig. 6, wherein the galvanometer is employed as an ammeter or milliammeter to produce deflections proportional to the strength of the current passed through the coil 11, the galvanometer being a part of optical pyrometer apparatus. The apparatus comprises the incandescent lamp L disposed within a tube between the eye piece $e$ and an objective $o$, in well known manner, the lamp L being connected in series with a suitable source of current, as a battery B, the resistance $a$ and $b$, and the adjustable resistance rheostat $r$, the latter being indicated in Fig. 1 as the helical resistance $r$ disposed upon the circumference of the cylinder 62 rotatable by the handle 63 with respect to the stationary contact 64. In shunt to the resistance $b$ are connected the coil 11 and the resistance $c$ in series with each other.

As well understood in the art, the instrument comprising the incandescent lamp L is sighted at the incandescent body whose temperature is to be determined, and the rheostat $r$ adjusted to increase or decrease the current through the filament of the lamp L until that filament matches in brightness that of the incandescent body whose temperature is to be determined. There is then a current of certain strength flowing through the coil 11 causing it to deflect with respect to the scale 48, which may be calibrated in units of current or preferably directly in temperatures, it having been previously determined for the particular lamp used what current strengths or what deflections of the needle 45 correspond with different temperatures.

In case the temperature of the incandescent body is so high that a current too great for the filament of the lamp L would have to be passed through it to procure a match in brightness, there may be interposed the absorption screen $s$, in which case the incandescent body will appear to have far less brightness when viewed through the eye piece $e$. In such case, for procuring a match in brightness the rheostat $r$ will be adjusted to proper extent, but in this case the second scale 47 is employed, the scale 47 reading in temperatures greater than scale 48.

When taking readings as above described, the frame 17, 20 lies against the abutment 26, in which case, with no current through the coil 11, there is such set or tension of the spring control 14, 15 that the pointer 45 is in contact with the stop 65, which prevents it from swinging further in a counter-clockwise direction, as viewed in Fig. 1, under the influence of the spring control, it being remembered that the moving system of the instrument, including the coil 11 and needle 45, tends to swing to such position that the spring control exerts zero torque upon it. The true or suppressed zero of the instrument, when the frame is against the abutment 26, lies a considerable angular distance, equal to the angular movement of the frame between the abutments 26, 27, in a counter-clockwise direction beyond the zero mark 66 later referred to. It is inconvenient to have a zero marking on the instrument at the position of the true or suppressed zero, and often impossible because the structure of the instrument is such that the coil could not swing to such position, particularly due to the fact that it is impossible to dispense with a support, as 10, for the internal core 8. To obviate this difficulty, however, the moving system together with its spring control, and without altering the tension or setting of the spring control, may be swung in a clockwise direction to bring the frame against the left hand abutment 27, in which case, if the instrument is in calibration so far as concerns the spring control, the pointer 45 will register exactly with the zero indicating mark 66 on the scale 46, which mark may coincide, as illustrated, with the beginning of one of the scales, as 48, or may be to either side of that position. If the spring control is out of adjustment, the arm 37 is moved, thereby changing the set or tension of the spring control system as hereinbefore described, the movement being of such extent and in such direction as to cause the needle 45 accurately to register with the zero mark 66, which, it will be understood, lies an angular distance in clockwise direction from the true or suppressed zero exactly equal to the angular movement of the frame between the abutments 26 and 27.

This construction will therefore be understood to be suitable for the case, as in the example above described, where the deflection of the needle in the lower part of its range as regards the true or suppressed zero is not utilized, but where some upper part of its range is employed. This is true in the example of use above described, because the filament of the lamp L must be traversed by considerable current before it attains a brightness suitable for optical pyrometry. And if the instrument were of the ordinary structure of milliammeter or similar galvanometer, the needle would be compelled to swing through a considerable angle corresponding with the useless current values before reaching a region corresponding with current strengths producing the necessary brilliancy of the lamp filament.

While we have hereinbefore described our improved structure as it may be employed in optical pyrometry, it will be understood that our invention is of general application to all cases where the useful range of the instrument is such as brings the true or suppressed zero far off the scale and inaccessible.

The instrument may be used for any suitable purposes either as a voltmeter or ammeter, or otherwise.

The end 32 of the spring 31 may be so located that the spring 31 will hold the frame against the abutment 26, and actuation of pin 30 by turn button 35 will move the frame in opposition to the spring 31 into engagement with abutment 27 for comparing the position of the pointer 45 with the zero mark 66, the spring 31 immediately upon release of turn button 35 returning the frame into engagement with abutment 26. This prevents carelessly leaving the frame in engagement with abutment 27, in which position passage of current through the coil 11 would move the pointer 45 violently in clockwise direction, as viewed in Fig. 1, until the moving system was stopped by engagement of some part thereof with a fixed part of the instrument, as for example, engagement of pointer 45 with the right hand stop 65ª, resulting in damage to the instrument.

When the end 32 of the spring 31 is midway between the poles of the magnet M, as hereinbefore described, whereby the frame will be held in engagement with either of the abutments 26 or 27, the instrument may serve as a double range instrument, the pointer 45 coöperating with one scale when the frame is in engagement with abutment 27, and coöperating with a second scale when in engagement with abutment 26, the second scale supplementing the first scale and increasing the range of the instrument. In such case the zero mark 66 may coincide exactly as to angular position with the beginning of the first scale or with the beginnings of both scales.

While we have described our invention as applied to a galvanometer comprising a movable coil, it will be understood that it is equally applicable to moving systems of other types.

What we claim is:

1. A galvanometer comprising stationary and movable elements, of a control for the movable element comprising means opposing its deflection with respect to the stationary element, a member movable with respect to said stationary element and between which member and said movable element said control is connected, whereby the position of said movable element for no current through the galvanometer may be shifted with respect to said stationary element by movement of said member, and means carried by said movable member for adjusting said control.

2. A galvanometer comprising stationary and movable elements, a spring control for said movable element, a member movable with respect to said stationary element and between which member and said movable element said spring control is connected, whereby the position of said movable element for no current through the galvanometer may be shifted with respect to said stationary element by movement of said member, and a member carried by and movable with said movable member for adjusting said spring control.

3. A galvanometer comprising a stationary element and a movable coil, a member movable with respect to said stationary element, an adjusting member carried by said movable member, a spring connected to said adjusting member and to said coil for opposing deflection of said coil with respect to said stationary element, whereby the position of said coil for no current therethrough may be shifted with respect to said stationary element by movement of said movable member.

4. A galvanometer comprising a permanent magnet and a movable coil, a member movable with respect to said magnet about the axis of said coil, a spring connected to said adjusting member and the said coil for opposing deflection of said coil with respect to said magnet, whereby the position of said coil for no current therethrough may be shifted with respect to said magnet by movement of said movable member.

5. A galvanometer comprising a stationary element and a movable coil, a member movable with respect to said stationary element about the axis of said coil, an adjusting member carried by said member, a spring connected to said adjusting member and to said coil for opposing deflection of said coil with respect to said stationary member, and abutments limiting the movement of said movable member, movement of said movable member from one abutment to another shifting the zero position of said coil with respect to said stationary element.

6. A galvanometer comprising a stationary element and a movable coil, a scale, a pointer actuated by said coil coöperating with said scale, a member movable with respect to said stationary element about the axis of said coil, an adjusting member carried by said member, a spring controlling said coil connected thereto and to said adjusting member, the zero position of said pointer being suppressed with respect to said scale, and means on said scale indicating the shifted position of said zero corresponding with predetermined movement of said movable member.

7. A galvanometer comprising a stationary element and a coil movable with respect thereto, abutments fixed with respect to said stationary element, a member movable between said abutments, a control spring for said coil connected thereto and to said member, and means carried by said member for adjusting the tension of said spring.

8. A galvanometer comprising a stationary element and a coil movable with respect thereto, abutments fixed with respect to said stationary element, a member movable between said abutments, a control spring for said coil connected thereto and to said member, and means for holding said member against either abutment to which it has been moved.

9. A galvanometer comprising a stationary element and a coil movable with respect thereto, abutments fixed with respect to said stationary element, a member movable between said abutments, a control spring for said coil connected thereto and to said member, and a spring controlling said member to hold the same in engagement with either abutment to which it is moved.

10. A galvanometer comprising a permanent magnet, a magnetizable core between the poles thereof, means for supporting said core, a coil movable in the gap between the magnet poles and said core, a frame movable about the axis of said coil and comprising parts disposed adjacent opposite ends of said coil, and springs opposing deflection of said coil connected respectively to said frame parts and to said coil.

11. A galvanometer comprising a stationary element and a pivoted coil, a frame movable with respect to said stationary element for shifting the zero position of said coil, an adjusting member carried by said frame and insulated therefrom, and a spring controlling the movement of said coil connected thereto and to said adjusting member, said spring forming an electrical connection between the winding of said coil and said adjusting member.

12. A galvanometer comprising a stationary element and a pivoted coil, a frame movable with respect to said stationary element for shifting the zero position of said coil, a member carried by said frame and insulated therefrom, a spring controlling the movement of said coil connected thereto and to said member, said spring forming an electrical connection between the winding of said coil and said member, and a second member carried by said frame for moving said first named member to adjust the tension of said spring.

13. A galvanometer comprising a stationary element and a coacting pivoted coil, a control for said coil comprising spiral springs each having one end connected to said coil, a frame movable about the axis of said coil, the other ends of said springs connected to said frame, said frame, said coil and said springs being rotatable in unison about the axis of said coil.

14. A galvanometer comprising a stationary element and a coacting pivoted coil, a control for said coil comprising spiral springs each having one end connected to said coil, a frame movable about the axis of said coil, the other ends of said springs connected to said frame, and means carried by said frame for adjusting said spring control.

15. A galvanometer comprising a permanent magnet and a coil pivoted in the field thereof, a frame having arms adjacent opposite ends of said coil and movable about the pivotal axis of said coil, and springs on opposite ends of said coil connected thereto and to said frame arms.

16. A galvanometer comprising a permanent magnet and a coil pivoted in the field thereof, a frame having arms adjacent opposite ends of said coil and movable about the pivotal axis of said coil, springs on opposite ends of said coil connected thereto and to said frame arms, and abutments between which said frame is movable to shift the zero position of said coil.

17. A galvanometer comprising a permanent magnet and a coil pivoted in the field thereof, a frame having arms adjacent opposite ends of said coil and movable about the pivotal axis of said coil, springs on opposite ends of said coil connected thereto and to said frame arms, and means carried by said frame for adjusting the tension of said springs.

18. A galvanometer comprising a permanent magnet and a coil movable in the field thereof, stationary pivot bearings, pivots on said coil coöperating with said bearings, a frame having arms rotatable upon said pivot bearings, a spring control for said coil connected to said coil, and a member to which said spring control is connected carried by said frame and movable with respect thereto about the axis of said coil.

19. A galvanometer comprising a stationary element and a pivoted coil, a member movable about the axis of said coil, a spring for controlling said coil having one end connected to said coil, and an adjusting member to which the other end of said spring is connected carried by said movable member and movable with respect thereto about the axis of said coil.

In testimony whereof we have hereunto affixed our signatures this 4" day of March, 1918.

IRVING B. SMITH.
CHARLES R. CARY.